United States Patent Office 3,055,739
Patented Sept. 25, 1962

3,055,739
STABILIZED NITRIC ACID
Richard C. Doss, Bartlesville, Okla., assignor to Phillips
Petroleum Company, a corporation of Delaware
No Drawing. Filed Sept. 8, 1959, Ser. No. 838,794
15 Claims. (Cl. 23—157)

This invention relates to stabilized nitric acid. In one aspect this invention relates to the stabilization of concentrated nitric acid. In another aspect this invention relates to a stabilized oxidizer mixture comprising nitric acid and an organic sulfonium compound.

Concentrated nitric acids such as are sold in the form of ordinary concentrated acid, white fuming nitric acid (WFNA), red fuming nitric acid (RFNA), and anhydrous nitric acid are important commercial products. These materials have many important uses such as for the preparation of fertilizers, in cleaning and etching solutions, etc. In recent years, said concentrated nitric acids have been used as oxidizer ingredient for rocket propellants, in both bipropellant applications and in monopropellant applications. When used as the oxidizer component in a bipropellant system, the acid is carried in the rocket or missile in a separate compartment or tank and is injected into the combustion chamber of the rocket motor as a separate stream where it contacts the fuel component, also injected as a separate stream. Said fuel component can be a hypergolic fuel, such as aniline, in which case spontaneous ignition takes place upon contact between the acid and the hypergolic fuel. Said fuel can also be a non-hypergolic fuel in which case the mixture formed when the acid and fuel are contacted is ignited by any suitable means such as a spark igniter. Monopropellant compositions consisting essentially of a fuel component, such as an amine nitrate, dissolved in nitric acid represent another application for said acids. In this type of application the monopropellant is stored in a tank carried by the rocket and is injected into the combustion chamber of said rocket where it is ignited.

Nitric acids, particularly concentrated nitric acids, are not stable during storage and tend to decompose according to the reaction:

$$4HNO_3 \rightarrow 4NO_2 + 2H_2O + O_2$$

Such decomposition of nitric acid during storage not only decreases the oxidizing power of the acid but also builds up pressure in the storage vessel. Over a period of time, gas pressure can build up in the storage vessel to a point which constitutes a serious hazard, and can sometimes even result in rupture of the storage vessel. Even when the acid is stored in a vented vessel so that storage pressure is of no concern, the loss in product quality which occurs upon prolonged storage is serious. Thus, it is important for all uses of nitric acid that, if possible, said acid be stabilized to reduce decomposition during storage. Stabilization is particularly important where the acid must be stored in closed containers, such as in the fuel tanks in a rocket motor, etc.

I have discovered that organic sulfonium compounds are effective stabilizers for nitric acid. Thus, broadly speaking, the present invention resides in a stabilized nitric acid containing a small but effective amount of an organic sulfonium compound.

An object of this invention is to provide a stabilized nitric acid. Another object of this invention is to provide an improved oxidizer mixture which is suitable for use in reaction motors, such as rocket motors, etc. Still another object of this invention is to provide a stabilized nitric acid which can be safely stored in closed containers. Other aspects, objects, and advantages of the invention will be apparent to those skilled in the art in view of this disclosure.

Thus, according to the invention, there is provided a stabilized nitric acid consisting essentially of nitric acid and from about 0.001 to about 10 weight percent of at least one organic sulfonium compound characterized by a formula selected from the group consisting of

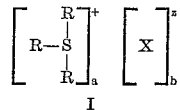

and

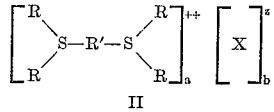

wherein: each R is selected from the group consisting of alkyl and cycloalkyl groups containing from 1 to 10 carbon atoms; R' is selected from the group consisting of alkylene radicals containing from 1 to 8 carbon atoms; X is an anion selection from the group consisting of nitrate, perchlorate, sulfate, hydrogen sulfate, phosphate, hydrogen phosphate, and dihydrogen phosphate anions; $a$ and $b$ are each integers of from 1 to 3, and the product of $a$ multiplied by the number of sulfur atoms is equal to the product of $b$ multiplied by the valence $z$ of said anion X; and the total number of carbon atoms in the molecule is from 3 to 12.

Preferably, the number of carbon atoms in said sulfonium compounds is from 3 to 7. The preferred sulfonium compounds are the sulfonium nitrates and most preferably the sulfonium nitrates wherein R is an alkyl group containing from 1 to 4 carbon atoms, and the sulfonium nitrates of the above Formula II wherein R' is an alkylene group containing from 1 to 4 carbon atoms.

Examples of organic sulfonium compounds which are useful in the practice of this invention include, among others, the following:

Trimethylsulfonium nitrate
Triethylsulfonium nitrate
Triethylsulfonium perchlorate
Tri-n-propylsulfonium nitrate
Tri-n-propylsulfonium perchlorate
Tri-n-butylsulfonium nitrate
Triisopropylsulfonium nitrate
Dimethylethylsulfonium sulfate
Diethylmethylsulfonium nitrate
Ethyldimethylsulfonium nitrate
Ethyldimethylsulfonium hydrogen sulfate
Ethyldibutylsulfonium nitrate
Ethyldibutylsulfonium phosphate
Dimethyloctylsulfonium nitrate
Methyldipentylsulfonium hydrogen phosphate
Ethyldipentylsulfonium nitrate
Ethyldipentylsulfonium dihydrogen phosphate
Hexylmethylpentylsulfonium nitrate
Decyldimethylsulfonium nitrate
Cyclohexyldimethylsulfonium nitrate
Dicyclopentylmethylsulfonium nitrate
Dimethylcyclopentylsulfonium nitrate
Diethylcyclohexylsulfonium nitrate
Dimethylcyclooctylsulfonium nitrate
(2-cyclohexylpropyl)ethylmethylsulfonium nitrate
(Cyclopentylmethyl)dimethylsulfonium nitrate
S,S,S',S'-tetramethylmethane-1,1-disulfonium dinitrate
S,S,S',S'-tetramethylethane-1,2-disulfonium dinitrate
S,S-diethyl-S',S'-dimethylethane-1,2-disulfonium dinitrate
S,S,S',S'-tetraethylpropane-1,2-disulfonium dinitrate
S,S,S',S'-tetraethylbutane-1,4-disulfonium dinitrate S,S,S',S'-tetramethylhexane-1,6-disulfonium dinitrate
S,S,S',S'-tetramethyl-2-ethylpropane-1,3-disulfonium dinitrate
S,S,S',S'-tetraethylpropane-1,3-disulfonium dinitrate
S,S,S',S'-tetramethylbutane-1,4-disulfonium dinitrate
S,S,S',S'-tetramethyloctane-1,8-disulfonium dinitrate
S,S,S',S'-tetramethylpropane-1,3-disulfonium diperchlorate
S,S,S',S'-tetraethylbutane-1,4-disulfonium diperchlorate For each of the above-named nitrates or other compounds there can be prepared and used the corresponding compounds having as the anionic component one of the other above-named inorganic anions.

The organic sulfonium compounds used in the practice of the invention can be prepared by any of a number of suitable methods well known to those skilled in the art. For example, trialkyl sulfonium nitrates can be prepared by reacting dialkyl sulfides with alkyl halides. The resulting sulfonium halide can then be reacted with silver nitrate to precipitate silver halide and to free the sulfonium nitrate. The trialkylsulfonium compounds can also be prepared from the corresponding hydroxides.

The disulfonium compounds can be prepared by methods comparable to those described above for the monosulfonium compounds. As an example, a dialkyl disulfide, such as S,S'-diethylpropane-1,3-disulfide, is reacted with an alkyl halide, such as ethyl chloride. The resulting S,S,S',S'-tetraalkyl disulfonium halide is reacted with silver nitrate to free the disulfonium nitrate. For the specific compounds named, the product is S,S,S',S'-tetraethylpropane-1,3-disulfonium dinitrate. When moist silver oxide is reacted with the sulfonium halide the corresponding sulfonium hydroxide is formed. The sulfonium hydroxide can be neutralized with the desired acid to form the corresponding salt, e.g. nitric acid forms the nitrate, perchloric acid forms the perchlorate, etc.

The organic sulfonium compounds are effective as stabilizers for nitric acids when used in small amounts. Generally, the amount used to stabilize the nitric acid is in the range of 0.1 to 10 percent, preferably within the range of about 0.1 to 5 percent, by weight of the total solution. However, amounts as small as 0.001 percent by weight can be used with beneficial results. The invention is applicable for stabilizing nitric acid of any concentration ranging from dilute acids containing as little as 1 weight percent $HNO_3$ up to and including anhydrous acids containing essentially 100 weight percent $HNO_3$. However, since the more concentrated acids are more unstable, the invention finds its greatest use in stabilizing the more concentrated acids, particularly those containing at least about 50 weight percent, or more, $HNO_3$. The invention is particularly applicable for stabilizing the concentrated white fuming nitric acids, red fuming nitric acids, and anhydrous nitric acid which are available commercially. White fuming nitric acid usually contains about 90 to 99 weight percent $HNO_3$, from 0 to 2 weight percent $NO_2$, and up to about 10 weight percent water. Red fuming nitric acid usually contains about 70 to 90 weight percent $HNO_3$, from 2 to 25 weight percent $NO_2$, and up to about 10 weight percent water. Fuming acids, both white and red, having concentrations of water, $NO_2$, and $HNO_3$ different from those given can, of course, be stabilized in accordance with the invention.

In the practice of the invention the acid to be stabilized can be mixed with one or more of the above-described organic sulfonium compounds in any convenient manner. It is generally preferred to add the organic sulfonium compound to the acid at temperatures below about 50° C., e.g. 0 to 30° C., with good agitation. The resulting acid solutions have an enhanced stability as measured, for example, by measuring changes in pressure in a closed container containing the acid solutions in storage.

The following example will serve to further illustrate the invention.

*Example*

Anhydrous nitric acid was prepared by distilling red fuming nitric acid in the presence of sulfuric acid. Analyses of typical batches of the distilled anhydrous nitric acid showed that the product contained more than 99.8 weight percent $HNO_3$ and less than 0.2 weight percent oxides of nitrogen.

The effectiveness of the organic sulfonium compounds as stabilizing agents for nitric acid is shown by a comparison of the storage stability at 200° F. of a sample (9.9 grams) of said anhydrous acid having dissolved therein 3.4 weight percent of trimethylsulfonium nitrate, with another sample of said acid containing no stabilizing agent. The storage stability of said two samples was determined according to the following procedure.

A small glass tube constructed from one-fourth inch I.D. glass pipe, which will withstand pressures greater than 1,000 p.s.i., is filled about two-thirds full (about 6 milliliters) with the nitric acid to be tested. Said tube is fitted with a safety head containing a blowout disc which will rupture at about 200 p.s.i.g. pressure. The small glass bomb is then placed in a constant temperature bath containing cold water and is connected to a pressure recorder and to a supply of compressed nitrogen gas. The pressure in said bomb is then increased to about 75 p.s.i.g. with nitrogen to check the system for leaks, and after checking the pressure in said bomb is reduced to 20 p.s.i.g. The temperature in the constant temperature bath, which can be regulated to maintain a temperature of 200° F., is increased and the time at which a temperature of 200° F. is reached is taken at the start of the test. The test is terminated when the pressure in said bomb exceeds 100 p.s.i.g., or when the blowout disc is ruptured (the pressure rise is often rapid after 100 p.s.i.g. is reached). The storage life of the acid being tested is recorded as the time necessary for the pressure in said bomb to increase from 20 to 100 p.s.i.g at a temperature of 200° F.

The results of the above tests showed that the pressure in the bomb containing the acid stabilized with trimethylsulfonium nitrate increased to about 92 p.s.i.g. during the first 8 hours of the test and then decreased slowly to 52 p.s.i.g. and remained essentially constant at that value until termination of the test at 713 hours. Thus, the stabilized acid had a storage life greater than 713 hours. The pressure in the bomb containing the sample of unstabilized nitric acid increased to 61 p.s.i.g. in 9 hours and the test was terminated after 28 hours when the pressure in said bomb had reached 100 p.s.i.g. Thus, the unstabilized acid had a storage life of only 28 hours.

The above tests show that the nitric acid stabilized with tetramethylene sulfone had a storage life more than 25 times longer than the unstabilized nitric acid.

Since many possible embodiments can be made of this invention without departing from the scope thereof, it is to be understood that all matter herein set forth is to be interpreted as illustrative and not in a limiting sense.

I claim:

1. A stabilized nitric acid consisting essentially of nitric acid and from about 0.001 to about 10 weight percent of at least one organic sulfonium compound characterized by a formula selected from the group consisting of

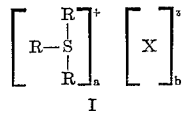

I and

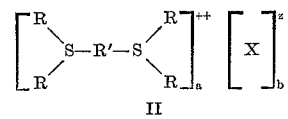

II wherein: each R is selected from the group consisting of alkyl and cycloalkyl groups containing from 1 to 10 carbon atoms; R' is selected from the group consisting of alkylene radicals containing from 1 to 8 carbon atoms; X is an anion selected from the group consisting of nitrate, perchlorate, sulfate, hydrogen sulfate, phosphate, hydrogen phosphate, and dihydrogen phosphate anions; $a$ and $b$ are each integers of from 1 to 3, and the product of $a$ multiplied by the number of sulfur atoms is equal to the product of $b$ multiplied by the valence $z$ of said anion X; and the total number of carbon atoms in the molecule is from 3 to 12.

2. A stabilized nitric acid according to claim 1 wherein the nitric acid to be stabilized contains at least 50 weight percent $HNO_3$.

3. A stabilized nitric acid according to claim 1 wherein the nitric acid to be stabilized contains at least 70 weight percent $HNO_3$.

4. A stabilized nitric acid according to claim 2 wherein the amount of said organic sulfonium compound is within the range of about 0.1 to 10 weight percent.

5. A stabilized nitric acid according to claim 2 wherein the amount of said organic sulfonium compound is within the range of 0.1 to about 5 weight percent.

6. The stabilized nitric acid of claim 1 wherein said organic sulfonium compound is trimethylsulfonium nitrate.

7. The stabilized nitric acid of claim 1 wherein said organic sulfonium compound is triethylsulfonium nitrate.

8. The stabilized nitric acid of claim 1 wherein said organic sulfonium compound is tri-n-propylsulfonium nitrate.

9. The stabilized nitric acid of claim 1 wherein said organic sulfonium compound is tri-n-butylsulfonium nitrate.

10. The stabilized nitric acid of claim 1 wherein said organic sulfonium compound is S,S,S',S'-tetramethylpropane-1,3-disulfonium dinitrate.

11. The stabilized nitric acid of claim 1 wherein said organic sulfonium compound is S,S,S',S'-tetraethylpropane-1,3-disulfonium dinitrate.

12. The stabilized nitric acid of claim 1 wherein said organic sulfonium compound is S,S,S',S'-tetramethylbutane-1,4-disulfonium dinitrate.

13. The stabilized nitric acid of claim 1 wherein said organic sulfonium compound is S,S,S',S'-tetramethylethane-1,2-disulfonium dinitrate.

14. The stabilized nitric acid of claim 6 wherein said acid contains at least 50 weight percent $HNO_3$.

15. The stabilized nitric acid of claim 6 wherein said acid contains at least 70 weight percent $HNO_3$.

References Cited in the file of this patent

UNITED STATES PATENTS

| | | |
|---|---|---|
| 2,760,845 | Konarek et al. | Aug. 28, 1956 |
| 2,763,619 | Pino | Sept. 18, 1956 |